United States Patent [19]

Miller

[11] 3,712,115

[45] Jan. 23, 1973

[54] PIPE TESTING APPARATUS

[75] Inventor: Darwin A. Miller, Houma, La.

[73] Assignee: Gerald F. Lofaso, Houma, La.

[22] Filed: Oct. 9, 1970

[21] Appl. No.: 79,397

[52] U.S. Cl. .....................73/49.1, 138/90, 166/187
[51] Int. Cl. ......................G01m 3/28, E21b 33/124
[58] Field of Search .....73/49.1, 49.2, 40.5 R, 405 A; 138/90, 91; 166/187

[56] References Cited

UNITED STATES PATENTS

| 3,071,960 | 1/1963 | Knapp et al. | 73/40.5 R |
|---|---|---|---|
| 2,715,444 | 8/1955 | Fewel | 166/187 |
| 2,841,007 | 7/1958 | Loomis | 73/40.5 R |

Primary Examiner—Louis R. Prince
Attorney—Carlos A. Torres, Bill B. Berryhill and Torres & Berryhill

[57] ABSTRACT

Upper and lower axially spaced, radially expansible seals are secured to each other by an elongate spacer bar to form a pipe testing assembly. The assembly is positioned within the pipe to be tested and fluid pressure is employed to expand the upper and lower seals radially into sealing engagement with the surrounding pipe. Pressurized test fluid is introduced into the pipe within the enclosed area between the spaced seals to test the pipe for leaks. The lower seal includes a mandrel over which a preshaped cup seal is slidably disposed above a plurality of annular compression seals. The test fluid moves the cup seal downwardly which compresses the compression seals and causes them to move radially outwardly into sealing engagement with the surrounding pipe. Fluid containing chambers are formed between the expanded cup seal and compression seals to provide a back pressure which prevents high pressure collapse of the cup seal. If desired, a second seal having the same construction as the lower seal may be inverted and employed as the upper seal in the testing assembly.

In a modified form, the preshaped cup seal is replaced by a normally retracted, annular working seal mounted on the mandrel which in turn is threadedly coupled with the lower end of the spacer bar. A friction drag holds the mandrel stationary and rotation of the spacer bar causes the upper end of the working seal to be moved outwardly by a cone spreader carried on the spacer bar whereupon the working seal functions in the same manner as the preformed cup seal of the preferred form. In its retracted position, the lower seal assembly has relatively small radial dimensions permitting it to be freely moved past constrictions within the pipe being tested and thereafter expanded into an operative cup shape by rotation of the spacer bar.

10 Claims, 6 Drawing Figures

PATENTED JAN 23 1973 3,712,115
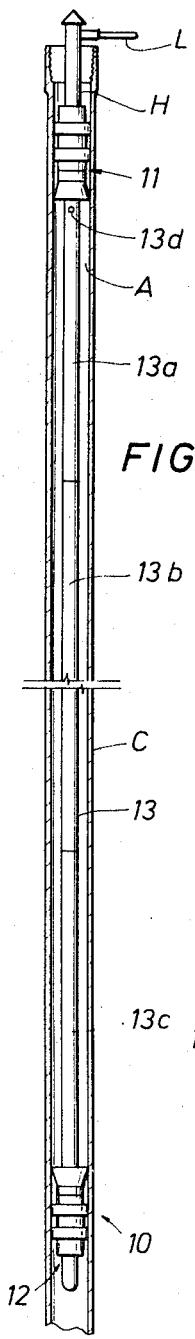
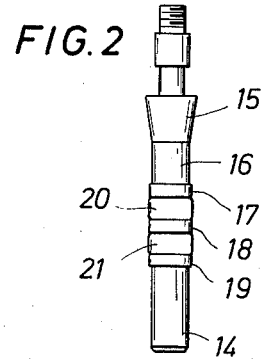
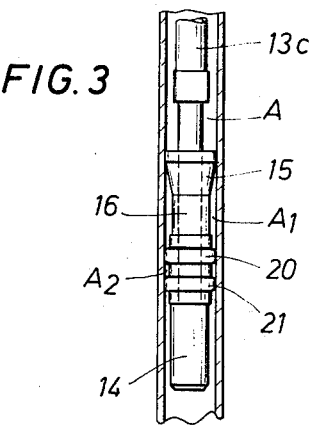
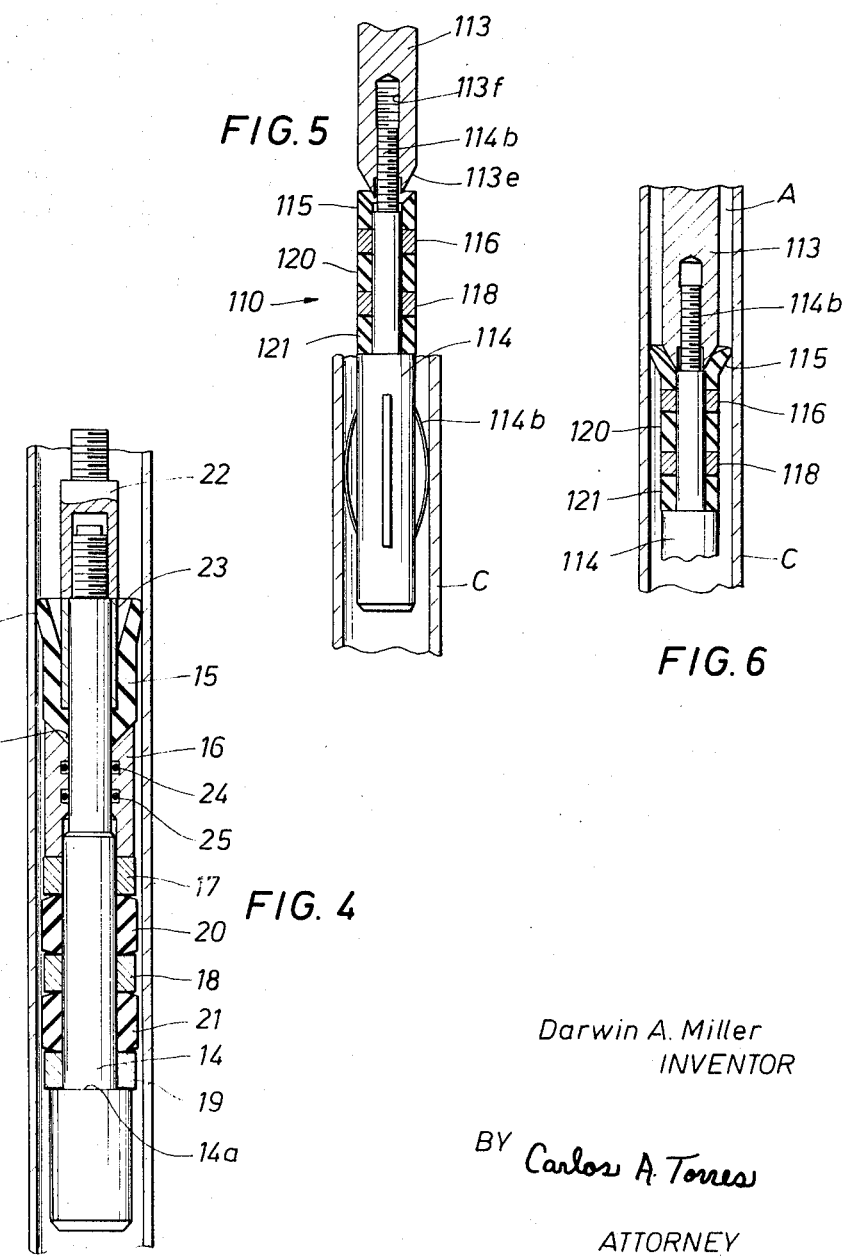
Darwin A. Miller
INVENTOR
BY Carlos A. Torres
ATTORNEY 3,712,115

PIPE TESTING APPARATUS

BACKGROUND OF THE INVENTION

1. Field of the Invention

The present invention relates to means for testing for leaks and structural weakness in tubular fluid conductors. More specifically, the present invention relates to a new and improved pipe tester for testing well pipe as it is being lowered into the well bore.

2. Brief Description of the Prior Art

The tubing strings, pipe lines, drill pipe and other conduits commonly associated with the production and transportation of oil and gas are often required to carry liquids and gas fluids which are under extremely high pressures, often as high as 15,000 psi or more. In order to avoid destructive and dangerous loss of oil and gas, such conduits are customarily tested for leakage and structural integrity before being put in use. Initially, each pipe section is normally inspected at the place where it is manufactured. Because of the danger of damage during transportation, the section is again tested before being placed in the well. Where pipe previously disposed in a well is removed and replaced, the replaced pipe is normally tested before being reused.

The devices and techniques employed in the testing of well pipe are extremely varied. Some of such devices are limited to testing for leakage at the joint between two mating sections while others test not only the joint but also the intermediate bodies between the joint. Many commonly employed testing devices test the pipe as it is being lowered into the well bore by creating an internal hydraulic pressure between axially spaced seals set within the pipe. The internal pressure is monitored for a short period and any decrease in the pressure is indicative of a leak. This technique is generally referred to as "hydrostatic pipe testing."

The lower seal in hydrostatic pipe testing devices is normally set by hydraulic pressure which is communicated to the lower seal through a bore formed in the connecting bar extending between the upper and lower seals. The hydraulic pressure is employed to move a piston in an expansion chamber which in turn compresses an annular, elastomeric seal causing the seal to move radially outwardly into sealing engagement with the surrounding pipe. The upper seal in such devices is normally set in substantially the same manner.

Setting devices which employ hydraulically actuated expansion chambers are normally expensive and difficult to maintain because of the fine tolerances and extensive machine work normally required in the manufacture and operation of such devices. Moreover, the lower expansion chamber in a conventional hydrostatic test tools must be supplied with high pressure fluid which is communicated to the chamber through a bore extending the length of the spacer bar which connects the upper and lower seals. In many cases, the connecting spacer bar is constructed in several mating sections to form a total length of approximately 90 feet. The cost of machining bores through the rods required to form spacer bars of this length are relatively high and the rods must be made of high quality, expensive alloys to withstand the high pressures encountered during the testing operation.

SUMMARY OF THE INVENTION

The apparatus of the present invention includes upper and lower axially spaced seals with the lower seal being set by fluid injected directly into the pipe in the area between the two spaced seals. By this means, the need for a central bore extending along the length of the connecting spacer bar structure is eliminated.

The bottom tool includes an upwardly facing cup seal which is driven downwardly by the testing fluid to compress and radially expand the annular compression seals. The expansion of the compression seals forces them into sealing engagement with the surrounding well pipe. Compressed fluid trapped between the annular seals and the cup seal in plural fluid chambers provides a support to the cup seal which prevents it from collapsing under extremely high pressures.

The combination of a cup seal and annular compression seals in the test tool assembly provides for a low-cost, easily operated and easily maintained apparatus which may be set with fluid pressure exerted in the annular area between the spacer bar and the surrounding pipe walls. In addition, where liquid test fluid is used, the lower cup seal retains the pressurizing liquid between each successive test to eliminate the need for completely refilling the entire pipe between the two seals between successive tests. The retention of the testing fluids also prevents dilution of well fluids and reduces the quantity of fluid required to perform the entire test. The top seal in the apparatus may, if desired, be formed from a tool constructed in the same manner as the bottom tool but inverted so that the mouth section of the cup seal is directed downwardly.

The combined use of cup seals and annular compression seals permits the use of a smaller, more resilient cup seal to be employed in the assembly which thereby permits the tools to be easily moved past internal restrictions formed within the pipe being tested. The increased pressure capability of the device is attributable to the formation of the fluid containing chambers upon the radial expansion of the annular seal rings. Trapped fluid in the chambers provides back pressure to the cup seal which prevents even relatively small, resilient cup seals from collapsing under the pressure of the testing fluid.

The cup seal and annular compression seals are assembled in a simple, direct manner over a single piece mandrel which contributes to low manufacturing costs, simplicity of operation and ease of maintenance.

In a modified form of the invention, an annular working seal positioned at the top of the seal assembly is adapted to be expanded radially outwardly into sealing engagement with the surrounding pipe wall. Before radial expansion, the working seal closely surrounds the supporting mandrel to provide a composite seal assembly which has relatively small radial dimensions to permit the tool to be freely moved through restrictions formed in the pipe under test. Once the non-expanded seal has been lowered below a restriction, rotation of the spacer bar causes a cone spreader to move into engagement with the working seal. The cone spreader causes the working seal to expand radially outwardly into the shape of a conventional cup seal until it engages the pipe wall whereupon the lower seal assembly functions in the manner previously described for the preferred form of the invention. After the test has been completed, the spacer bar is rotated in the opposite direction permitting the working seal to retract inwardly so that the assembly may be removed from the pipe.

The foregoing features and advantages of the present invention as well as others may be better understood by reference to the following specification, drawings and the related claims.

BRIEF DESCRIPTION OF THE DRAWINGS

FIG. 1 is an elevation, partly in section, illustrating the pipe testing apparatus of the present invention in operative position with a pipe which is to be tested;

FIG. 2 is an elevation of the lower test tool of the apparatus of the present invention;

FIG. 3 is an elevation, partially in section, illustrating the lower test tool of the present invention in its set position within a surrounding well pipe;

FIG. 4 is a vertical section, on an enlarged scale, illustrating the bottom test tool of the present invention in its unset condition;

FIG. 5 is an elevation, partially in section illustrating a modified, mechanically expandable form of the present invention; and FIG. 6 is a vertical section showing the modified form of the tool in its partially expanded unset position.

DESCRIPTION OF THE PREFERRED EMBODIMENTS

Referring to FIG. 1, a preferred form of the apparatus of the present invention is indicated generally at 10 as it appears when positioned within a well conduit C which is to be tested for leaks and structural strength. The test assembly 10 includes an upper test tool 11, a lower test tool 12 and a connecting spacer bar 13. The spacer bar 13 is made up of a plurality of connecting rods 13a, 13b and 13c to provide the desired axial spacing between the upper and lower test tools.

In conducting the test on the conduit C, a suitable testing fluid such as water is introduced into an annular area A formed between the spacer bar 13 and the surrounding walls of the conduit C. The test fluid may be introduced into the annular area A by means of a supply line L connected through a head assembly H which channels fluid supplied by the line through the upper seal 11 where it is injected into the annular area A through an exhaust bore 13d. The head assembly H is conventional and it will be understood that any suitable means for introducing the test fluid into the annular area A may be employed with the apparatus 10.

When the annular area A has been filled with the test fluid, the fluid is pressurized to a predetermined value and a pressure sensitive monitor (not shown) is employed to detect any loss of pressure to indicate the presence of leakage in the walls of the conduit C or at the joints at mating sections forming the conduit C.

It will be appreciated that the upper and lower seals 11 and 12, respectively, must provide a leakproof engagement with the surrounding walls of the conduit C which is sufficient to withstand the high pressures employed in the testing fluid filling the annular area A. In the pipe testing apparatus 10, the fluid pressure employed in testing the pipe section C is also employed to set the lower test tool 11 causing it to move into firm sealing engagement with the surrounding conduit walls.

Referring jointly to FIGS. 2, 3 and 4, it may be seen that the lower test tool 12 includes a central mandrel 14 which is threadedly engaged at its upper end with the spacer bar rod 13c. The mandrel 14 carries a seal means having an upper preformed cup seal section 15. The base section of the seal 15 is carried in a concave seat formed at the upper end of a cup mount 16. The resilient cup seal 15 and metallic, non-yieldable cup mount 16 are positioned above a compression seal assembly including three metallic spacer rings 17, 18 and 19 spaced about dual resilient compression ring seals 20 and 21.

The upper end of the tool 12 includes an adapter member 22 designed to secure the mandrel 14 to the lower end of the spacer rod 13c. A mounting sleeve 23 is positioned between the body of the mandrel 14 and the internal bore of the cup seal 15 to retain the cup seal in firm sealing engagement with the upper end of the cup mount 16. Resilient O-ring seals 24 and 25 are formed internally of the cup mount 16 to provide a continuous, sliding seal between the cup mount and the underlying mandrel 14.

In operation, the lower test tool 12 is set by the testing fluid injected into the annular area A. The seal 15 includes an upper mouth section 15a which is in sealing engagement with the surrounding wall of the conduit C at all times. The test fluid in the annular area A acts against the mouth section 15a causing it to move radially outwardly into tight sealing engagement with the surrounding wall and simultaneously tending to exert a downwardly directed force on the seal. A base section 15b formed at the lower portion of the cup seal 15 sealingly engages the underlying mandrel 14 and cooperates with the annular seals 24 and 25 in the cup mount 16 to form a continuous fluid seal in the conduit C. Increasing pressure in the annular area A acts against the cup seal 15 causing it to move downwardly with respect to the relatively stationary mandrel 14. This downward motion and attendant force is transmitted by the cup mount 16 to the lower compression seal assembly. As the cup mount 16 is moved downwardly over the mandrel, the resilient compression seals 20 and 21 are foreshortened axially between the base of the cup mount and an upper retaining shoulder 14a formed near the bottom portion of the mandrel 14.

As the rings 20 and 21 are foreshortened axially, they expand radially into engagement with the surrounding walls of the conduit C as illustrated in FIG. 3. In its expanded position, the tool 12 forms two fluid containing chambers $A_1$ and $A_2$. Where the testing fluid is a liquid, the fluid contained in the areas $A_1$ and $A_2$ resist compressions and provides a support to the cup seal 15 permitting it to withstand relatively high fluid pressures in the testing annulus A. The formation of plural fluid containing chambers as illustrated, assists in reducing the extent of axial travel of the cup 15 on the mandrel to provide the desired high pressure strength. When pressure in the annulus A is reduced, the sealing engagement of the compression rings 20 and 21 is automatically terminated.

Between each test, the normally expanded cup 15 retains the liquid in the annular area A to eliminate the need for refilling the area each time a new section of conduit is to be tested. By this means, the time required to complete an entire test may be substantially decreased and the amount of water or other fluid required in completing the test can be substantially reduced. If desired, the upper test tool 11 may be of similar construction to the test tool 12 but reversed in position so that the high pressure fluid in the annular area A tends to drive the compression seal assembly upwardly over the supporting mandrel. It should, however, be understood that either the upper or lower test tool may be employed in combination with any suitable mechanism for providing the desired seal of the well conduit.

Referring to FIGS. 5 and 6, a modified form of the test tool is indicated generally at 110. The tool 110 includes a mandrel 114 which is threadedly secured by means of threads 114b formed at its upper end to a spreader cone member having a conical spreading surface 113e and central internal threads 113f adapted to mate with the mandrel threads 114b. An annular working seal 115 is carried over the mandrel 114 in the manner illustrated in FIG. 5. The seal 115 is the uppermost seal in a seal assembly which includes a force transmitting ring 116 formed of metal and two resilient annular compression seals 120 and 121 separated by a metallic spacer ring 118. The tool 110 is completed by resilient drag spring members 114b which are adapted to engage the surrounding walls of the conduit C to hold the mandrel stationary with respect to the conduit.

In operation, the tester 110 is lowered into position within the conduit C and when the desired subsurface location has been reached, the spacer bar 113 is rotated to advance the internal threads 113f over the upper mandrel threads 114b. During rotation of the spacer bar 113, the drag springs 114b frictionally engage the surrounding wall of the conduit C to hold the mandrel stationary. Rotation of the threads 113f about the mandrel threads 114b moves the conical spreading surface 113e downwardly with respect to the working seal 113.

As best illustrated in FIG. 6, downward movement of the conical surface 113e forces the mouth portion of the working seal radially outwardly into engagement with the surrounding walls of the conduit C. Once the seal 115 has engaged the pipe wall, the seal functions in the same manner as previously described for the conventional, preformed cup seal of the preferred embodiment wherein fluid pressure in the annular area A moves the cup seal downwardly thereby compressing the two annular compression rings and moving them into sealing engagement with the surrounding pipe wall. After the test has been completed, the direction of rotation of the spacer bar 113 is reversed causing the spreader surface 113e to move away from the resilient seal 115 thereby permitting it to retract radially inwardly. While the embodiment of FIGS. 5 and 6 may be employed in any conduit, it will be understood that it is especially advantageous where restrictions formed within the conduit require the use of a tool having relatively small radial dimensions.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A test tool adapted to be positioned in a tubular well pipe comprising:
   a. an axially extending mandrel means having upper and lower axially spaced ends;
   b. lower seal means including resilient cup seal means having base section means slidably and sealingly carried on said mandrel means and mouth section means adapted to open upwardly to slidably engage the internal walls of said tubular well pipe for forming a seal between said mandrel means and said well pipe;
   c. radially expansible, resilient compression seal means carried on said mandrel means and adapted to expand radially into sealing engagement with said well pipe when foreshortened axially for forming a seal between said mandrel means and said well pipe;
   d. retaining means connected with said lower end of said mandrel means for forming a lower retaining base for said compression seal means;
   e. non-resilient force transmitting means slidingly and sealingly carried on said mandrel means between said cup seal means and said compression seal means for transmitting downward axial movement of said cup seal means to said compression seal means whereby said compression seal means is foreshortened axially between said force transmitting means and said retaining means;
   f. axially extending spacer bar means having upper and lower axially spaced ends with said lower bar means end secured to said upper mandrel end;
   g. upper seal means connected with said upper bar means end and adapted to sealingly engage the pipe wall to form a seal between said bar means and said pipe wall;
   h. fluid injection means for injecting a pressurized liquid or gas fluid into the annular area between said bar means and said well pipe in the area between upper and lower seal means; and
   i. means to force said mouth section means into sealing engagement with the internal walls of said tubular pipe, said pressurized fluid within said annular area forcing said cup seal means against said non-resilient force transmitting means to foreshorten axially said compression seal means and thereby cause it to expand radially into its sealing engagement with said well pipe.

2. A test tool as defined in claim 1 wherein said lower seal means further includes fluid chamber forming means for producing a plurality of annular, fluid filled chambers between said lower seal means and said well pipe.

3. A test tool as defined in claim 2 wherein said fluid chamber forming means includes a plurality of annular, expansible elastomeric rings separated axially from each other by non-expansible spacer means.

4. A test tool as defined in claim 1 wherein said cup seal means includes expander means for expanding said mouth section means radially outwardly into sealing engagement with the internal pipe walls.

5. A test tool as defined in claim 4 wherein said expander means includes spreader means having a conical surface adapted to move downwardly with respect to said mandrel means and said cup seal means whereby said conical surface advances between said mandrel means and said cup seal means causing said cup seal means to be forced radially outwardly into sealing engagement with the internal pipe walls.

6. A test tool as defined in claim 5 wherein:
a. said conical spreading surface is fixed with respect to said spacer bar means;
b. said mandrel means is threadedly engaged with said spacer bar means; and
c. said mandrel means includes friction producing drag means slidably engaging the internal pipe walls for holding said mandrel means stationary with respect to said pipe whereby rotation of said spacer bar means moves said conical spreading surface toward or away from said cup seal means causing said cup seal to radially expand or retract depending upon the direction of rotation of said spacer bar means.

7. A test tool as defined in claim 3 wherein said cup seal means includes expander means for expanding said mouth section means radially outwardly into sealing engagement with the internal pipe walls.

8. A test tool as defined in claim 7 wherein said expander means includes spreader means having a conical surface adapted to move downwardly with respect to said mandrel means and said cup seal means whereby said conical surface advances between said mandrel means and said cup seal means causing said cup seal means to be forced radially outwardly into sealing engagement with the internal pipe walls.

9. A test tool as defined in claim 8 wherein:
a. said conical spreading surface is fixed with respect to said spacer bar means;
b. said mandrel means is threadedly engaged with said spacer bar means; and
c. said mandrel means includes friction producing drag means slidably engaging the internal pipe walls for holding said mandrel means stationary with respect to said pipe whereby rotation of said spacer bar means moves said conical spreading surface toward or away from said cup seal means causing said cup seal to expand or retract depending upon the direction of rotation of said spacer bar means.

10. A test tool as defined in claim 1 wherein said means to force said mouth section means into sealing engagement with the internal walls of said tubular pipe comprises said pressurized fluid in said annular area.

* * * * *